United States Patent
Hayward et al.

(10) Patent No.: US 8,583,783 B1
(45) Date of Patent: Nov. 12, 2013

(54) METHOD AND SYSTEM FOR ADAPTIVE RECOVERY OF HEAP MEMORY

(75) Inventors: Brian E. Hayward, Lawrence, KS (US); Shaun M. Johnson, Kansas City, MO (US); Justin A. Martin, Olathe, KS (US); Brian J. Washburn, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 657 days.

(21) Appl. No.: 12/543,449

(22) Filed: Aug. 18, 2009

(51) Int. Cl.
G06F 15/173 (2006.01)
G06F 12/00 (2006.01)

(52) U.S. Cl.
USPC .......................... 709/224; 709/226; 707/813

(58) Field of Classification Search
USPC .......................................... 707/813; 709/224
See application file for complete search history.

(56) References Cited

U.S. PATENT DOCUMENTS 7,779,054 B1 * 8/2010 Printezis et al. .............. 707/813
2004/0133759 A1 * 7/2004 Sekiguchi ..................... 711/170

OTHER PUBLICATIONS

"JVM Tuning Guide," JVM Tuning Guide—IMONIT/SARS, http://Capacity/joomla/components/com_joomlawiki/index.php/JVM_Tuning_Guide, Dec. 18, 2009, 2 pages.

* cited by examiner

Primary Examiner — Hung T Vy
Assistant Examiner — Tuan-Khanh Phan

(57) ABSTRACT

A method is provided for garbage collection in a heap of an application server that uses automated garbage collection. The method comprises gathering information about a plurality of garbage collection events. The method further comprises identifying a correlation between garbage collection activity and a volume of applications transactions in the application server. The method further comprises, based on the correlation, forecasting at least one of a future utilization of heap memory and a future garbage collection activity based on a projected future transaction volume. The method further comprises tuning the heap based on the forecast.

13 Claims, 2 Drawing Sheets

METHOD AND SYSTEM FOR ADAPTIVE RECOVERY OF HEAP MEMORY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Java applications may be executed within a variety of commercially available Java virtual machine (JVM) execution frameworks. A JVM can be installed on a server computer to act as a virtual application server within the actual server. One feature of a typical JVM is a memory area known as the heap, where objects created during the execution of a Java program can be stored. The JVM can periodically perform a garbage collection procedure on the heap, during which memory locations used by objects that are no longer referenced by the program are freed for other uses. This automated garbage collection process can relieve the Java programmer from the task of writing code to release the memory allocated to objects that are no longer used.

The heap can be divided into at least two sections or generations. Recently created objects are placed in a young generation. As the young generation fills up, a minor or incremental garbage collection procedure can be performed, in which memory space used by objects that are no longer referenced by the Java program is reclaimed. Objects that are still being referenced are moved to an old or tenured generation. As the old generation fills up, a major garbage collection procedure can be performed. A major garbage collection involves an examination of all objects in both the young and old generations and can therefore last much longer than a minor garbage collection.

Since all application processing stops while a minor or major garbage collection event is occurring, it may be desirable to reduce the amount of time spent in garbage collection. This is especially relevant for a multi-processor system since only one of the plurality of processors can perform garbage collection at a given time. Throughput in such a system might be greatly reduced since the other processors in the system remain idle while a single processor performs garbage collection.

SUMMARY

In an embodiment, a method is provided for garbage collection in a heap of an application server that uses automated garbage collection. The method comprises gathering information about a plurality of garbage collection events. The method further comprises identifying a correlation between garbage collection activity and a volume of applications transactions in the application server. The method further comprises based on the correlation, forecasting at least one of a future utilization of heap memory and a future garbage collection activity based on a projected future transaction volume. The method further comprises tuning the heap based on the forecast.

In another embodiment, a system is provided for garbage collection in a heap of an application server that uses automated garbage collection. The system comprises a data storage component configured to retain information about a plurality of garbage collection events. The system further comprises at least one processing component configured to identify a correlation between garbage collection activity and a volume of applications transactions in the application server, to predict, based on the correlation, at least one of a future utilization of heap memory and a future garbage collection activity based on a projection of future transaction volume, and adapts at least one heap parameter based on the prediction.

In another embodiment, a computer-based method of memory management is disclosed. The method comprises analyzing logs of garbage collection events performed by a Java Virtual Machine (JVM) to determine an average duration of garbage collection events, determining an average duration of transactions performed by the Java Virtual Machine, determining an average rate of transactions performed by the Java Virtual Machine, and adjusting memory management parameters based on at least one of the average duration of garbage collection events, the average duration of transactions, and the average rate of transactions.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
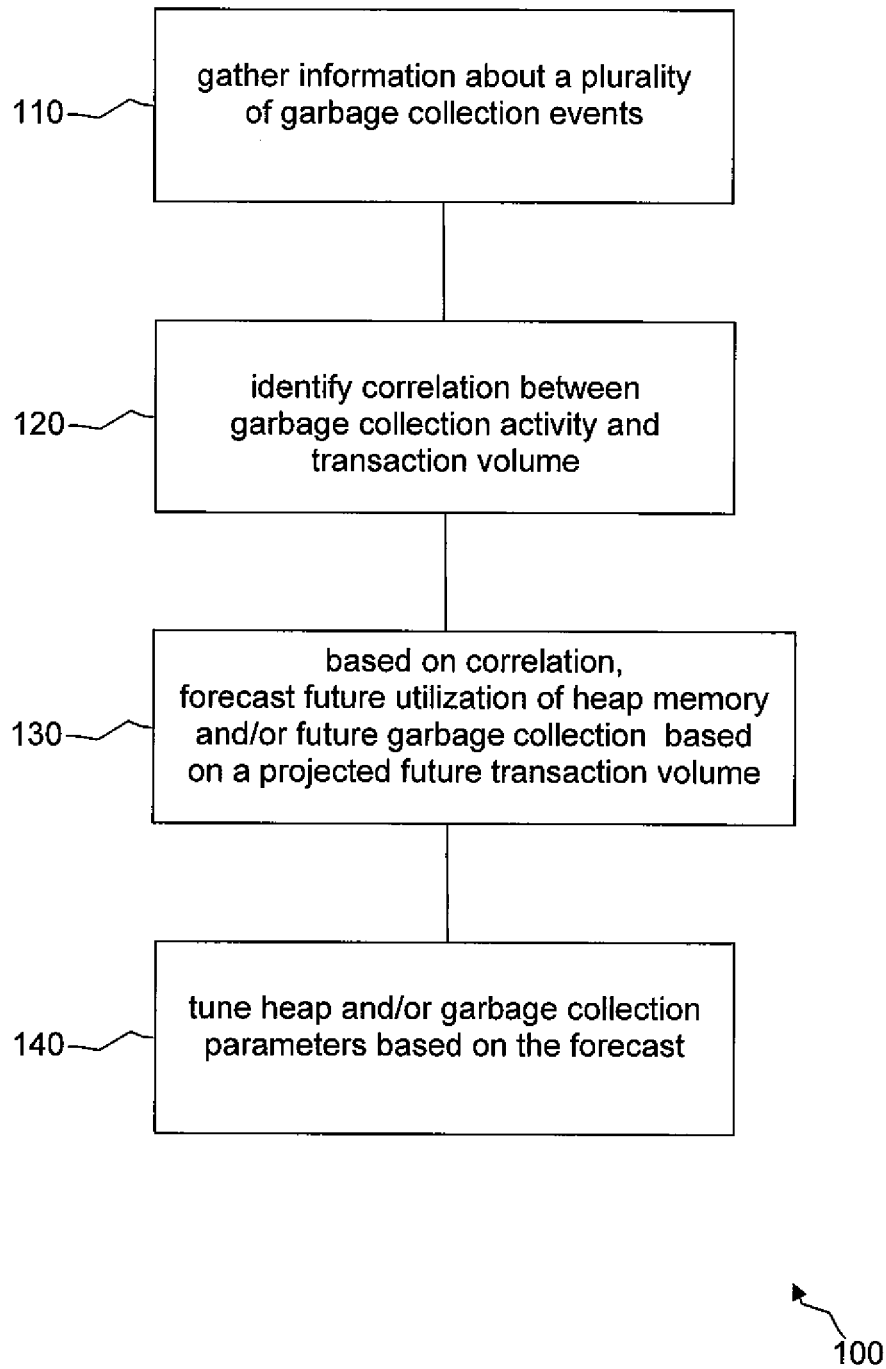
FIG. 1 is a flow chart of a method for garbage collection in a heap of an application server that uses automated garbage collection, in accordance with one or more embodiments of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

In embodiments of the present disclosure, whenever a garbage collection event occurs, data related to the event is sent to and stored in a central location. Data from multiple garbage collection events can then be analyzed, and trends in the garbage collection activities over time can be observed. These trends can then be correlated with application processing activities that occurred over a similar time period. Based on this analysis, future utilization of dynamically allocated memory and/or heap memory and future garbage collection activities can be forecasted, and garbage collection parameters may be adjusted to adapt to this forecast to better achieve system performance objectives, for example balancing a desire for relatively small garbage collection periods against efficient utilization of processor resources. As a specific example, in an embodiment, the heap memory may be proactively tuned, either manually or automatically, to perform future garbage collection events efficiently based on the projected application processing requirements. In some contexts hereinafter, in the interests of brevity, the term memory may be used to refer to dynamic memory and/or heap memory or to refer to other types of memory, for example random access memory (RAM), read only memory (ROM), or secondary storage. The intended sense of the term memory will be apparent from the context.

Currently, for each garbage collection event, the Java Virtual Machine (JVM) generates a log file that indicates when the garbage collection occurred, how long the garbage collection lasted, how much memory was available before the garbage collection took place, how much memory was available after the garbage collection took place, and other information. The garbage collection log was originally created to assist developers in troubleshooting. That is, if processing delays or other problems were noticed in an application, a developer could examine the garbage collection log file and determine if the problem could be solved by adjusting one or more parameters related to the garbage collection procedure.

For example, a small application might start with a relatively small heap. If the processing volume of the application increased over time or if the object sizes increased, the object memory in the heap might fill up faster. Garbage collections might begin occurring closer together and/or might start taking longer. This could cause delays in the processing of the application because, in an embodiment, all application processing may stop during garbage collection. If delays occur, a developer could examine the log file, observe the current garbage collection and heap parameters, make modifications to the parameters affecting garbage collection to reduce the amount of time spent in garbage collection, and thus reduce application processing delays. For example, the developer might adjust the length and/or frequency of the garbage collection events or might adjust the size of the young and/or old generation or might increase the size of the heap allocated for the application.

However, the garbage collection log does not maintain a history; only the most recent data can be seen. Every time the JVM recycles, the log resets and the previous garbage collection information is deleted. If the transaction volume increased again after heap tuning and/or garbage collection parameter tuning was performed, further delays could occur, and the most recent log file might need to be examined to determine if additional tuning is needed. Such reactive troubleshooting might need to occur each time processing delays are observed.

In an embodiment, the garbage collection log files are transferred to and maintained in a centralized location. Multiple log files covering extended periods of time can then be examined and trends in heap garbage collection can be determined. Knowledge about garbage collection trends can be combined with projections about future processing requirements to forecast future utilization of dynamically allocated memory and/or heap memory and future garbage collection activities, and based on these forecasts garbage collection parameters and/or heap parameters may be adapted, to reduce and/or to prevent processing delays and other problems from occurring. In some cases, an automated system might be in place to determine garbage collection trends and automatically adjust the garbage collection parameters and/or heap parameters based on forecasts of future heap utilization and/or future garbage collection activities. These embodiments can be contrasted with the reactive troubleshooting that is currently done, wherein only a single garbage collection log is examined in order to solve an existing problem.

As mentioned previously, the log data might include the time when a garbage collection event occurred, the length of time that the garbage collection lasted, how much memory was available before the garbage collection took place, how much memory was available after the garbage collection took place, and other information. The log data might be transmitted in the extensible markup language (XML) format or another appropriate format to a central database or other storage area.

When data from multiple garbage collection events has been gathered, the data can be analyzed to determine the number of garbage collection events that have occurred, the types of garbage collection events that have occurred, the lengths of the garbage collection events, and the percentage of memory recovery for the garbage collection events. The volume of the data transactions that have occurred over approximately the same period of time can be obtained from another source. A correlation between the transaction volume and the related garbage collection parameters can then be obtained, and a prediction can be made about the garbage collection parameters that might be applicable if the transaction volume were to increase. Since the amount of time spent in garbage collection theoretically correlates fairly strongly with the number of objects flowing through the system, when the transaction volume increases, the time spent in garbage collection can be expected to increase. If there are multiple instances of the JVM, an aggregate picture for the heap and garbage collection parameters for all of the instances can be obtained.

When the transaction volume is forecast to increase, appropriate actions can be taken to ensure that the additional volume does not cause application processing delays. The actions might include adjusting garbage collection parameters, adjusting heap parameters, modifying the method by which garbage collection is performed, and/or adding JVM instances. Adding JVM instances may comprise launching additional JVMs on the same computer and/or bringing up an additional computer and launching one or more additional JVMs on the additional computer. In some contexts, adding additional JVMs may be referred to as adding instances of the application server. Any one or any combination of these actions could be referred to as tuning the heap. Adjusting the garbage collection parameters could include adjusting how often garbage collection occurs or adjusting how long garbage collection lasts. Adjusting the heap parameters could include adjusting the size of the young and/or old generations. Modifying the method by which garbage collection is performed could involve converting to or from a mark and sweep algorithm or some other well known garbage collection technique. Tuning the heap based on garbage collection trends and projected transaction volumes can eliminate the need for purchasing additional hardware to handle an increase in transaction volume.

In some cases, if the transaction volume is projected to increase, a flag or other indicator may be raised to indicate that the heap might need to be tuned. The heap might then be tuned manually. In other cases, the heap might be tuned automatically if the transaction volume is projected to increase.

For example, if a growth in transactions of 20% is expected, the garbage collection performance that might be needed for such a level of growth can be predicted, and it can be determined whether the current garbage collection parameters will be acceptable. If the current parameters are considered inadequate, appropriate adjustments can be made.

Rules might be developed about how garbage collection should occur. For example, if garbage collections occur too frequently, too many objects may still be active, and time would be wasted without cleaning out much garbage. If garbage collections occur too infrequently, the heap could become so full that the garbage collections take too long. If the size of the heap is reduced, more frequent but less impacting garbage collection will be done. But since the heap is smaller, it will fill up more quickly.

As an example, a rule might state that the average length of time between garbage collection events should be a certain multiple of the average transaction time, such as two or two-and-a half times the average transaction time. For instance, for a four second average transaction time, the average length of time between garbage collection events might be set to a minimum of ten seconds. This can prevent the length of time between garbage collections from being too close to the length of the transaction times, a situation that could lead to inadequate cleaning of the heap.

Another rule might state that the length of a garbage collection event should be a certain fraction of the average length of a transaction. For instance, the length of a garbage collection event could be set to be no more than half the length of a transaction. This could prevent garbage collection from lasting so long that noticeable delays in application processing occur.

Another rule might state that in five minutes, no more than thirty minor collections should be done. Another rule might state that no more than one major collection should be done per hour. Another rule might state that at least 75% of the memory space in the young generation should be reclaimed in each garbage collection and at least 50% of the memory space in the old generation should be reclaimed in each garbage collection. Another rule might state that the percentage of time spent in garbage collection should not exceed 2% of total processing time. Another rule might state that if more than thirty garbage collection events occur in five minutes, a notification should be made. In combination with and/or suggested by the present disclosure, those of skill in the art might recognize other rules that could be implemented.

FIG. 1 illustrates an embodiment of a method 100 for garbage collection in a heap of an application server that uses automated garbage collection. At block 110, information about a plurality of garbage collection events is gathered. At block 120, a correlation is identified between garbage collection activity and transaction volume. At block 130, based on the correlation, a forecast of future utilization of heap memory and/or future garbage collection activities is determined based on a projected future transaction volume. At block 140, the heap and/or the garbage collection parameters are tuned based on the forecast.

In another embodiment, a computer-based method of memory management promotes dynamically adjusting memory management parameters. For example, the logs of garbage collection events may be analyzed to determine an average duration of garbage collection events, an average frequency of garbage collection events, and other garbage collection statistics. It is understood that garbage collection is a kind of memory management, because garbage collection involves identifying dynamically allocated memory, for example heap memory, that is no longer used by the subject application and freeing this memory for use by the subject application, or other applications, for further dynamic memory needs. The method includes determining an average duration of transactions performed, for example, by the JVM and determining an average rate of transactions performed by the JVM. The method further adjusts memory management parameters, for example the size of the heap memory space, the frequency of garbage collection, and other memory management parameters, based at least on the average duration of transactions and the average rate of transactions.

Figure 2:
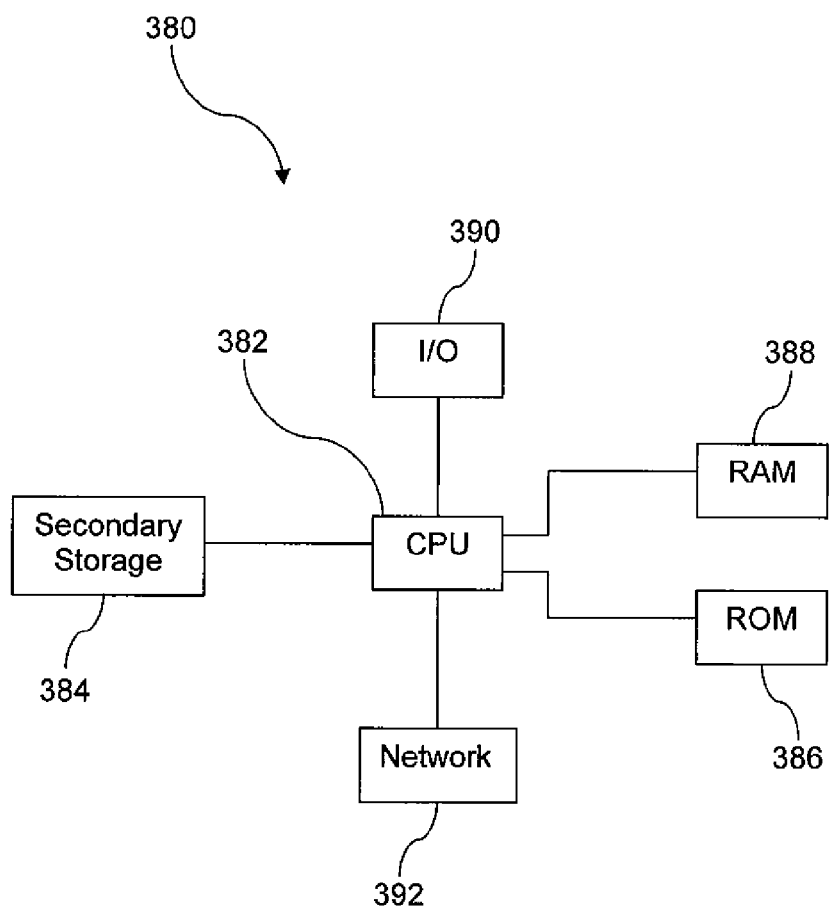
FIG. 2 illustrates an exemplary computer system suitable for implementing the several embodiments of the disclosure.

Some aspects of the system described above may be implemented on any computer with sufficient processing power, memory resources, and network throughput capability to handle the necessary workload placed upon it. FIG. 2 illustrates a typical computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and other air interface protocol radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 392 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for automated garbage collection in a heap of an application server, comprising:
    gathering a plurality of garbage collection log files associated with a plurality of garbage collection events over periods of time;
    analyzing data from the plurality of garbage collection log files;
    determining a trend in the garbage collection activities over the periods of time based on the analyzing;
    obtaining data on a volume of application transactions in the application server that have occurred over the same periods of time from another source;
    projecting either an increase or decrease in the volume of application transactions in the application server based on the data obtained on the volume of application transactions;
    identifying a correlation between garbage collection activity and the data obtained on the volume of application transactions in the application server based on the trend;
    forecasting at least one of a future utilization of heap memory and a future garbage collection activity based on the correlation and the projected increase or decrease in the volume of application transactions; and
    tuning the heap based on the forecast, wherein tuning the heap comprises setting an average length of time between garbage collection events to a multiple of an average length of time of an application transaction, and wherein the average length of time between garbage collection events is set to at least twice the average length of time of an application transaction.

2. The method of claim 1, wherein the heap is tuned automatically.

3. The method of claim 1, wherein tuning the heap comprises at least one of adjusting at least one garbage collection parameter, adjusting at least one heap parameter, modifying a method by which garbage collection is performed, and adding at least one instance of the application server.

4. The method of claim 3, wherein adjusting at least one heap parameter comprises at least one of adjusting the size of a young generation of the heap and adjusting the size of an old generation of the heap.

5. The method of claim 3, wherein adjusting at least one garbage collection parameter comprises at least one of adjusting how often garbage collection occurs and adjusting how long garbage collection lasts.

6. The method of claim 1, wherein the application server is a Java virtual machine.

7. A system for automated garbage collection in a heap of an application server, comprising:
    a data storage component configured to retain information about a plurality of garbage collection log files associated with a plurality of garbage collection events over periods of time;
    a processor in communication with the data storage component; and
    at least one processing component that, when executed by the processor, analyzes data from the plurality of garbage collection log files, determines a trend in the garbage collection activities over the periods of time based on the analyzing, obtains data on a volume of application transactions in the application server that have occurred over the same periods of time from another source, projects either an increase or decrease in the volume of application transactions in the application server based on the data obtained on the volume of application transactions, identifies a correlation between garbage collection activity and the data obtained on the volume of application transactions in the application server based on the trend, forecasts, based on the correlation and the projected increase or decrease in the volume of application transactions, at least one of a future utilization of heap memory and a future garbage collection activity, and adapts at least one heap parameter based on the forecast, wherein adapting at least one heap parameter comprises at least one of adjusting at least one garbage collection parameter, adjusting at least one heap parameter, modifying a method by which garbage collection is performed, and adding at least one instance of the application server, wherein adapting at least one heap parameter comprises setting an average length of time between garbage collection events to a multiple of an average length of time of an application transaction, and wherein adapting at least one heap parameter comprises setting an average length of time between garbage collection events to at least twice an average length of time of an application transaction.

8. The system of claim 7, wherein the heap is tuned automatically.

9. The system of claim 7, wherein adjusting at least one garbage collection parameter comprises at least one of adjusting how often garbage collection occurs and adjusting how long garbage collection lasts.

10. The system of claim 7, wherein adjusting at least one heap parameter comprises at least one of adjusting the size of a young generation of the heap and adjusting the size of an old generation of the heap.

11. A computer-based method of memory management, comprising:

analyzing logs of garbage collection events performed by a Java Virtual Machine (JVM) over periods of time to determine an average duration of garbage collection events;

determining an average duration of application transactions performed by the Java Virtual Machine;

determining an average rate of application transactions performed by the Java Virtual Machine;

obtaining data on a volume of application transactions performed by the Java Virtual Machine that have occurred over the same periods of time from another source;

projecting either an increase or decrease in the volume of applications transactions performed by the Java Virtual Machine based on the data obtained on the volume of application transactions;

forecasting at least one of a future utilization of heap memory and a future garbage collection activity based on a correlation between garbage collection activity and the data obtained on the volume of application transactions performed by the Java Virtual Machine and based on the projected increase or decrease in the volume of application transactions; and adjusting memory management parameters based on the forecast, the average duration of garbage collection events, and at least one of the average duration of application transactions and the average rate of application transactions, wherein an average length of time between garbage collection events is set to at least twice an average length of time of an application transaction.

12. The method of claim 11, wherein adjusting memory management parameters comprises adjusting the size of a heap memory space.

13. The method of claim 11, wherein adjusting memory management parameters comprises adjusting of how often garbage collection occurs.

* * * * *